July 31, 1951 R. G. SELDEN 2,562,336
RIVET
Filed Oct. 1, 1945
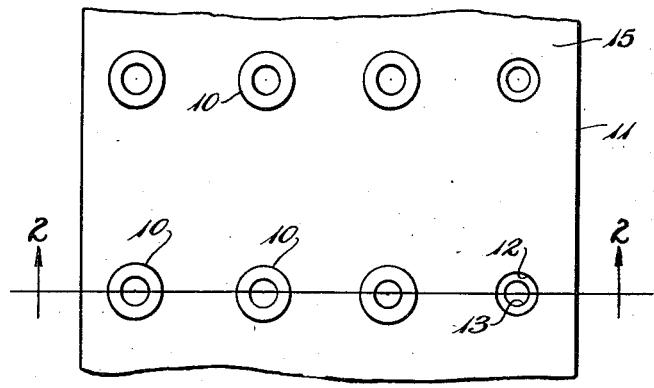
Fig-1
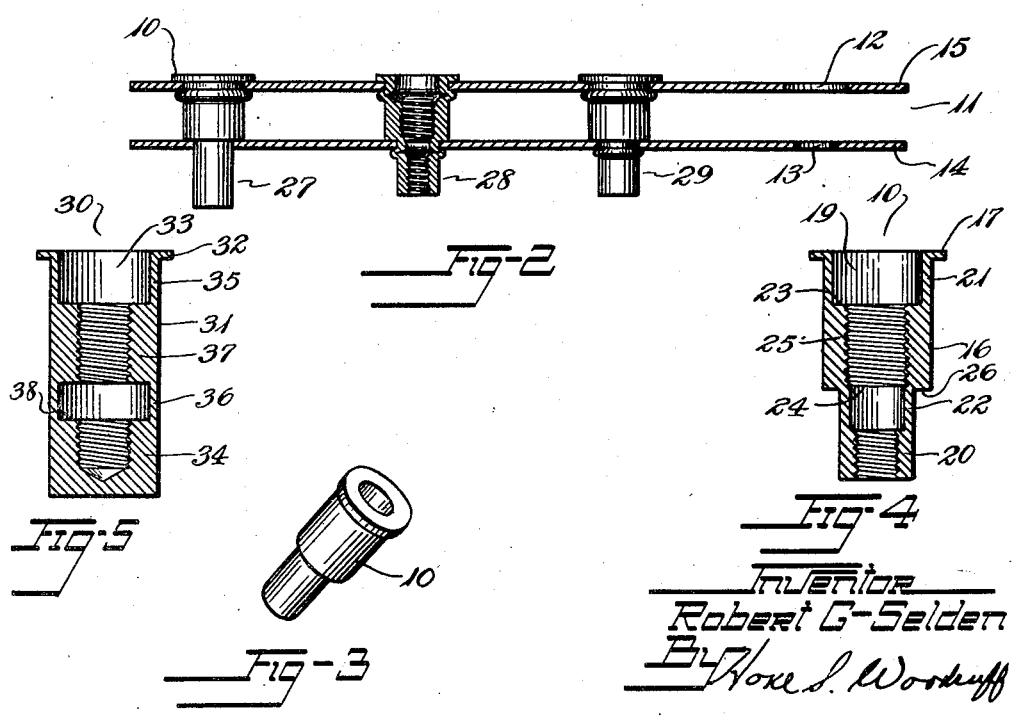
Inventor
Robert G. Selden Patented July 31, 1951

2,562,336

UNITED STATES PATENT OFFICE 2,562,336

RIVET

Robert G. Selden, Cuyahoga Falls, Ohio, assignor to The B. F. Goodrich Company, New York, N. Y., a corporation of New York Application October 1, 1945, Serial No. 619,529

4 Claims. (Cl. 85—40)

The invention relates to rivets and especially to rivets suitable for double walls of structures.

In airplane structures such, for example, as wings having double coverings or an inner and an outer skin or wall of thin sheet aluminum in spaced-apart relation to one another and with a hollow space therebetween, it is difficult to fixedly secure such inner and outer skins to one another and to adjacent parts, especially where blind riveting must be resorted to, i. e., where only one side of the double wall or skin is available for operations. It is also difficult to maintain permanently the inner and outer skins in such spaced-apart relation substantially uniformly throughout their entire extent especially under the distorting action of load and other stresses on such structures and air pressure differentials which may exist at the double wall. The invention is applicable especially for such constructions and for such purposes but is not necessarily limited thereto.

Objects of the invention are to provide an improved hollow rivet; to provide for engaging a wall at a plurality of positions in spaced-apart series along the rivet; to provide for outwardly collapsing the wall of the rivet at such plurality of positions; to provide for such collapsing of the rivet by operations from one side only of the wall and preferably in a sequential manner relative to said side of the wall; to provide for maintaining the spacing of the parts of a double wall construction and for strengthening such double wall construction, especially to resist distortion; to provide for fixedly securing such wall parts together in spaced relationship and for retaining the rivet in an aperture through the wall; to provide for so maintaining and securing such parts of the double wall in a substantially fluid-tight manner; and to provide simplicity of construction, convenience of manufacture and installation, and for effectiveness of operation.

Other objects of the invention are to provide substantially fluid-tight attachments on the double walls of structures; and to provide an attachment in which a body can be detachably mounted on such walls by a screw member leaving the walls substantially water-tight and even air-tight and especially whether the body and screw-member be mounted or removed.

These and further objects and advantages will be apparent from the following description, reference being had to the accompanying drawing in which:

Fig. 1 is a plan view of a double wall construction having improved hollow rivets constructed in accordance with and embodying the invention, parts being broken away;

Fig. 2 is a section taken along line 2—2 of Fig. 1;

Fig. 3 is a perspective view of the improved rivet before assembly with the wall;

Fig. 4 is a longitudinal sectional view of the rivet; and

Fig. 5 is a longitudinal sectional view of a modified construction of the rivet.

In the illustrative construction shown in Fig. 1 a plurality of rivets 10, 10 embodying the invention are disposed in spaced-apart relationship in a wall 11 of double construction having aligned apertures 12, 13 for receiving such rivets 10, 10. The wall 11 may be a component of an airplane structure such, for example, as the covering of a wing having an inner 14 and an outer 15 skin of thin sheet aluminum or other suitable light-weight relatively stiff sheet material in spaced-apart relation to one another with a hollow space therebetween providing the desired double wall construction. For the arrangement shown, the improved rivets 10, 10 not only function as spacing means to maintain permanently the inner and outer skins 14 and 15 in the desired substantially uniformly spaced-apart relation substantially throughout their extent, but also function to secure and hold fixedly together such inner and outer skins or wall parts together in such spaced-apart relationship while so maintaining and securing such parts in a substantially fluid-tight manner.

Each rivet 10 is preferably of a light, strong ductile material such as aluminum although it may be of copper, steel or other suitable alloy. Preferably, the rivet 10 comprises a cylindrical and tubular body 16 having desirably a flange 17 at one end thereof for seating against a face such, for example, as the outer skin 15 of the wall 11. The body 16 is of the desired length and has a bore 19 extending therethrough from the flange 17 and terminating at an opposite end portion 20 of the rivet, the bore 19 being defined by an annular and continuous wall, as shown especially in Figs. 2, 3 and 4. Such wall of the rivet 10 includes a pair of spaced-apart outwardly-collapsible portions 21, 22 in series along the cylindrical body for engaging the inner and outer skins 14 and 15, respectively. The outwardly-collapsible cylindrical portions 21, 22 are interconnected by an internally-threaded intermediate portion 25 extending between adjacent sides 23, 24 of the collapsible portions 21, 22 and engageable with a screw member (not shown) inserted in the bore of the rivet from the flanged end thereof. This facilitates the application of axial pressure with circumferential uniformity by virtue of the threaded connection at the intermediate portion 25 for outwardly collapsing the portion 21 which assures uniform pressure application entirely around the rivet by the screw-member used for collapsing the rivet. The end portion 20 extends from the other side of the collapsible portion 22 and is also internally threaded for facilitating collapsing the portion 22 by the application of substantially circumferentially uniform and endwise pressure by a second screw member (not shown) similarly inserted in the bore of the rivet. The cylindrical form of the outwardly-collapsible portions 21, 22 of the rivet gives maximum material in the bulged or substantially folded regions of the expanded rivet for maximum holding strength and substantial water-tightness of the joint.

The wall of the rivet 10 at the respective outwardly-collapsible portions 21, 22 may be of the same or different thickness but such wall at each such portions is of lesser radial thickness than that at the intermediate portion 25 and desirably the end portion 20, and the provision of such reduced wall thickness may be accomplished by having the bore 19 of a different diameter at each of the wall portions 20, 21, 22 and 25. To this end, the rivet may have a counterbore extending from the flanged end throughout the extent of the portion 21 to the side 23 thereof and may also have at the portion 22 a counterbore of lesser diameter than that at the first said portion 21, as shown especially in Fig. 4. The bore 19 at the internally threaded intermediate portion 25 is desirably of greater diameter than that at the end portion 20 and of the same or lesser diameter than that of the counterbore at the portion 22 for facilitating the free passage of the screw member through the portions 22, 25 for engaging the end portion 20 to collapse the outwardly-collapsible portion 22 in sequence after the first collapsible portion 21 has been expanded in a substantially folded manner, as shown especially in Fig. 2.

The body 16 throughout the extent of the first collapsible portion 21 and the intermediate portion 25 is desirably of substantially uniform and of greater external diameter as compared to the substantially uniform and external diameter thereof at the other collapsible portion 22 and the end portion 20. Such arrangement facilitates the provision of a backing shoulder 26 having desirably a flat seating face intermediate the ends of the rivet 10 at the junction of the respective portions 22 and 25, which shoulder assures backing support of the thin inner skin 14 of the wall during the collapsing operations of the aforesaid other collapsible portion 22 and further functions to assure the desired spacing between the inner and outer skins 14 and 15.

In assembling the rivet 10 with the skins 14 and 15, the rivet is threadedly engaged at the intermediate portion 25 with the screw member of a suitable tool such, for example, as shown in Patent 2,149,199 to Harry E. Waner. The rivet is then inserted through the registering apertures 12, 13 in the inner and outer skins 14, 15 such that the flange 17 is seated against the outer skin 15 and the shoulder 26 is seated against the inner skin 14. The rivet 10 may then be shortened by axial pressure applied at the intermediate portion as as to collapse the outwardly-collapsible portion 21 in a substantially folded manner, as shown especially in Fig. 2 at 27, thereby forming a flange on each side of the outer skin 15. The screw member of the tool is then removed and a second screw member of lesser diameter is inserted in the bore 19 from the flanged end. Such second member passes freely through the bore at the intermediate and collapsible portions 22, 25 and is threadedly engaged with the end portion 20. The other outwardly collapsible portion 22 is then expanded by the application of axial endwise pressure at the end portion 20 by means of such second screw member, the backing shoulder 26 functioning to provide substantially circumferentially uniform support for the inner skin 14 during the expanding of the portion 22 thereby effectively resisting inward localized distortion of the inner skin 14 toward the outer skin 15.

The sequential shortening of the rivet by axial pressure applied at the means on either side of the collapsible portions 21, 22 adapted to cooperate with the tool, such means comprising the flange 17, the intermediate portion 25 and the end portion 20, as described hereinabove, is shown especially in Fig. 2 at 27, 28 and 29. The condition of the rivet upon completion of the first phase of the shortening operation is shown at 27 and upon completion of both phases at 28 and 29. It will be noted that the condition shown at 28 illustrates clearly the outwardly-extending folds in the wall of the rivet at the respective collapsible portions 21, 22 engaging the inner and outer skins 14, 15.

The rivet construction thus advantageously provides for uniting and maintaining the inner and outer skins 14, 15 in the desired spaced-apart relationship and materially strengthens the wall against substantial distortion by a bracing strut action. It also advantageously assures the desired spacing between the inner and outer skins while effectively resisting localized distortion of the thin metal skins during the blind riveting operations. An additional advantage is that the attachment of other structural parts of the airplane directly to the wing skin in a substantially fluid-tight manner is facilitated inasmuch as screw fasteners threadedly engaging preferably the intermediate portion 25 of the rivet may be used for such purposes.

If desired, the end portion 20 of the rivet 10 may be completely closed in the manner of the modified construction illustrated especially in Fig. 5, whereby a substantially fluid-tight attachment is assured whether the other part of the airplane structure and screw fastener be mounted or removed relative to the wing.

It is to be understood that in addition to functioning as a spacing and stiffening means for the double skin covering of the wing, that the rivet may be used for attaching securely such wing covering to adjacent structure of the wing or other aircraft part and for other like attaching purposes. The rivet 10 is also applicable to relatively thick walls of substantially solid, or multiply, or both constructions, especially those constructions having a facing or facings of relatively stiff sheet material such as metal, plastic, glass, plywood, and other like materials at one or both sides of the walls for facilitating engagement with the wall at one or both collapsible portions of the rivet substantially in the manner shown in Figs. 1 to 4. In the case of such solid of multi-ply walls, if desired, the rivet at its end portion 20 need not project beyond the wall and the collapsible portion 22, which is relatively remote from the flange 17 may, if desired, be expanded outwardly into the material of the solid wall for facilitating secure attachment of the rivet to the wall at spaced-apart zones along the rivet.

The modified construction 30 of the rivet shown in Fig. 5 is useful for the convenient attachment in hollow walls and is particularly suited for solid or multi-ply wall applications; since the rivet 30 eliminates the necessity of a wall aperture of two different diameters as in the case of rivet 10 and may be sequentially shortened using a single screw member for the tool. The arrangement is also such that the screw fastener for detachably mounting a body to the wall may be threadedly engaged along a relatively greater extent of the rivet 30 as compared to that of the rivet 10.

To these ends, the rivet 30 which may be of ductile material like that of the rivet 10, comprises a cylindrical body 31 of substantially uniform diameter throughout its extent having a flange 32 at one end for seating against a face of the wall and having a bore 33 therein extending from the flanged end and terminating in a closed and internally threaded end portion 34 and defined by an annular continuous wall. The wall of the rivet 30 includes a pair of spaced-apart outwardly-collapsible portions 35, 36 in series along the body 31 and an internally threaded intermediate portion 37 interconnecting the aforesaid portions 35, 36, the closed end portion 34 extending along the body 31 from the side 38 of the second collapsible portion 36.

The bore 33 is desirably of the same substantially uniform diameter at the intermediate portion 37 and the closed end portion 34 and the wall of the bore at such portions 34, 37 is internally threaded for engaging a screw member. The bore 33 is of greater diameter at the collapsible portions 35, 36 than that at the portions 34, 37 facilitating the provision of walls at the outwardly-collapsible portions 35, 36 of lesser radial thickness than that at the respective intermediate and closed end portions. The thickness of the walls at the outwardly-collapsible portions 35, 36 is desirably the same, although each such walls may be of different thickness relative to the other, if desired.

The construction of the rivet 30 is advantageous in providing an attachment in which a body can be detachably mounted on the wall by a screw fastener preferably threadedly engaged at both the intermediate and the closed end portion 37, 34, although such threaded engagement may be only at the intermediate portion 37. The closed end of the body 31 further assures maintaining the wall substantially water-tight and even air-tight whether the body and screw member be mounted or removed.

In assembling the rivet 30 with the wall, for example, when the wall is of double or hollow construction substantially as shown in Fig. 2, the rivet 30 is first placed in threaded engagement with the screw member of the tool and then is inserted in the registering apertures of identical diameter in the wall 11 such that the flange 32 seats against one face 15 of the wall and the body 31 projects outwardly beyond the wall at the other face 14 thereof. The rivet 30 is in engagement with the screw member only at the intermediate portion 37. Such screw member under the action of the tool applies substantially uniform pressure entirely around the rivet and axially in the direction toward the flange 32 outwardly collapsing the portion 35 in a substantially folded manner providing a flange on each side of the facing or skin 15 of the wall, the cylindrical form of the collapsible portion giving maximum material in the bulge for maximum holding strength and water-tightness of the part. The screw member is then disengaged with the intermediate portion 37 and engaged with the threaded wall of the closed end portion 34. The collapsible portion 36 is also collapsed in a substantially folded manner by the application of endwise pressure through the screw member providing a flange against the other facing or skin 14 of the wall substantially like that of the collapsed portion 35.

The proportions of the rivet 30 are such as to accommodate the rivet to the thickness of the wall to which it is to be applied, whereby the outwardly collapsible portion 36 is correctly disposed with relation to said other facing 14 of the wall. Such other facing may be made of sufficient thickness and stiffness to resist inward localized distortion during the collapsing action of the portion 36.

When the wall is of substantially solid or laminated multi-ply construction with a single facing of suitable material and is of greater thickness than the length of the rivet 30, the latter under such conditions may be collapsed in the aforesaid manner, whereby the flange formed by the collapsing of the portion 35 not only facilitates clamping the facing between such flange and the flange 32 of the rivet but engages the material of the solid wall and the flange provided by the collapsed portion 36 also engages the material of the solid wall further assuring holding the rivet in such wall. Such construction provides the desired fluid-tight attachment of the rivet to the wall and assures the strong attachment of a body in a detachable manner to the wall as by the screw fastener in full engagement with the rivet at its intermediate and closed end portions.

Variations may be made without departing from the scope of the invention as it is defined by the following claims.

I claim:

1. A tubular rivet adapted to be inserted in an aperture in a structure and upset by operation from one side only of the structure, said rivet comprising a body having a head end and a bore extending from said end into said body, the wall of said body comprising, axially spaced-apart outwardly-collapsible portions, an intermediate portion separating said outwardly-collapsible portions, and an end portion beyond the outwardly-collapsible portion remote from said head end, said outwardly-collapsible portions having walls of lesser thickness than that of the intermediate and end portions so as to be bulged outwardly by forces applied axially to the rivet and transmitted axially through said intermediate and end portions to said outwardly-collapsible portions of said body, into the form of a pair of structure-engaging flanges separated by said intermediate portion, and said wall of said body having means in said bore at said intermediate and end portions for detachably selectively securing said portions to an upsetting member inserted from said head end to apply the upsetting forces to said body in the axial direction thereof.

2. A tubular rivet adapted to be inserted in an aperture in a structure and upset by operation from one side only of the structure, said rivet comprising a body having a head end and a bore extending from said end into said body, the wall of said body comprising outwardly-collapsible portions one of which is located adjacent said end and the other being spaced therefrom at a position along said bore, an intermediate portion separating said outwardly-collapsible portions, and an end portion at the side of said other of the outwardly-collapsible portions remote from said head end, said outwardly-collapsible portions having continuously annular walls of lesser thickness than that of the intermediate and end portions so as to be bulged outwardly by forces applied axially to the rivet and transmitted axially through said intermediate and end portions to said outwardly-collapsible portions of said body, into the form of a pair of structure-engaging flanges separated by said intermediate portion, and said wall of said body being interiorly threaded at said intermediate and end portions for detachably engaging an exteriorly threaded upsetting member inserted from said head end to apply the upsetting forces to said body in the axial direction thereof.

3. A tubular rivet adapted to be inserted in an aperture in a structure and upset by operation from one side only of the structure, said rivet comprising a cylindrical body having a head at one end thereof and a cylindrical bore extending from said end into said body, the wall of said body being continuously annular and comprising outwardly-collapsible portions one of which is located adjacent said head and the other being spaced therefrom at a position along said bore, an intermediate portion extending between said outwardly-collapsible portions, and an end portion at the side of said other of the outwardly-collapsible portions remote from said head, said outwardly-collapsible portions having walls of lesser thickness than that of the intermediate and end portions so as to be bulged outwardly by forces applied axially of the rivet and transmitted axially through said intermediate and end portions to said outwardly-collapsible portions of said body, into the form of a pair of structure-engaging flanges separated by said intermediate portion, and said wall of said body being interiorly threaded at said intermediate and end portions for detachably engaging an exteriorly threaded upsetting member inserted from the headed end to apply the upsetting forces to said body in the axial direction thereof.

4. A tubular rivet adapted to be seated in aligned apertures in spaced-apart work-elements and upset therein by operation from one side only of the work to maintain said work-elements in spaced-apart relation, said rivet comprising a body having a head end for engaging one of said work-elements and having a bore extending from said end into said body, the wall of said body having a stepped construction providing outwardly-collapsible portions one of which extends from said end and the other being spaced therefrom at a position along said bore, an intermediate portion including a shoulder separating said outwardly-collapsible portions, and an end portion extending from said other of the outwardly-collapsible portions in the direction axially away from said head end, said outwardly-collapsible portions having walls of lesser thickness than that of the intermediate and end portions so as to be bulged outwardly by forces applied axially of the rivet and transmitted axially through said intermediate and end portions to said outwardly-collapsible portions of said body, into the form of a pair of work-engaging flanges separated by said intermediate portion for holding the first said work-element between said head end and one of said flanges and for holding the other work-element between said shoulder and the other flange, and the wall of said body being interiorly threaded at said intermediate and end portions for detachably engaging and exteriorly threaded upsetting member inserted from said head end to apply the upsetting forces to said body in the axial direction thereof.

ROBERT G. SELDEN.

REFERENCES CITED

The following references are of record in the file of this patent:

UNITED STATES PATENTS

| Number | Name | Date |
|---|---|---|
| 161,077 | Tongas | Mar. 23, 1875 |
| 650,627 | Anderson | May 29, 1900 |
| 731,513 | Shaffer | June 23, 1903 |
| 991,517 | Kennedy | May 9, 1911 |
| 1,026,632 | Mueller | May 14, 1912 |
| 1,191,729 | Pool | July 18, 1916 |
| 1,205,666 | Rosenfeld | Nov. 21, 1916 |
| 1,556,406 | Block | Oct. 6, 1925 |
| 1,716,195 | Stockstrom | June 4, 1929 |
| 2,324,142 | Ecklund | July 13, 1943 |
| 2,343,143 | Gill | Feb. 29, 1944 |
| 2,389,479 | Austin | Nov. 20, 1945 |